(12) United States Patent
Kiest, Jr.

(10) Patent No.: US 6,427,726 B1
(45) Date of Patent: Aug. 6, 2002

(54) METHOD FOR RESIN ACTIVATION IN PIPELINE REPAIR

(75) Inventor: Larry W. Kiest, Jr., Ottawa, IL (US)

(73) Assignee: Blue Sky Forever, Inc., Warrenville, IL (US)

( * ) Notice: Subject to any disclaimer, the term of this patent is extended or adjusted under 35 U.S.C. 154(b) by 0 days.

(21) Appl. No.: 09/899,748

(22) Filed: Jun. 25, 2001

(51) Int. Cl.[7] ................................................ F16L 55/16
(52) U.S. Cl. ........................... 138/98; 138/97; 156/287; 264/36
(58) Field of Search ...................... 138/98, 97; 156/207, 156/295; 264/36, 369

(56) References Cited

U.S. PATENT DOCUMENTS

| | | | |
|---|---|---|---|
| 5,280,811 A | * 1/1994 | Catallo et al. | 138/97 |
| 5,411,060 A | * 5/1995 | Chandler | 138/103 |
| 5,439,033 A | * 8/1995 | Kamiyama et al. | 138/97 |
| 5,501,248 A | 3/1996 | Kiest, Jr. | 138/98 |
| 5,634,743 A | * 6/1997 | Chandler | 138/98 |
| 5,680,885 A | * 10/1997 | Catallo | 138/97 |
| 5,698,056 A | * 12/1997 | Kamiyama et al. | 138/98 |
| 5,765,597 A | 6/1998 | Kiest, Jr. et al. | 138/78 |
| 5,794,663 A | 8/1998 | Kiest, Jr. et al. | 138/98 |
| 5,855,729 A | 1/1999 | Kiest, Jr. et al. | 156/423 |
| 5,927,341 A | 7/1999 | Taylor | 138/98 |
| 5,937,910 A | * 8/1999 | Chandler | 138/97 |
| 5,950,682 A | 9/1999 | Kiest, Jr. | 138/98 |
| 5,964,249 A | 10/1999 | Kiest, Jr. | 138/98 |
| 6,021,815 A | 2/2000 | Kiest, Jr. et al. | 138/98 |
| 6,024,910 A | * 2/2000 | Kamiyama et al. | 138/97 |
| 6,039,079 A | 3/2000 | Kiest, Jr. | 138/98 |
| 6,050,300 A | * 4/2000 | Schwert et al. | 138/97 |
| 6,105,619 A | * 8/2000 | Kiest, Jr. | 138/97 |
| 6,117,507 A | * 9/2000 | Smith | 138/97 |
| 6,311,730 B2 | * 11/2001 | Penza | 138/98 |

* cited by examiner

*Primary Examiner*—Patrick Brinson
(74) *Attorney, Agent, or Firm*—McKee, Voorhees & Sease, P.L.C.

(57) ABSTRACT

A method for repairing pipelines includes impregnating a liner material capable of absorbing a fluid with a fluid uncured and unhardened resin requiring a catalyst for activation to cure and harden. The impregnated liner material is inserted within the pipeline and a catalyst is applied within the pipeline. Resin is then allowed to cure and harden to form a repaired surface for the interior of the pipeline.

19 Claims, 6 Drawing Sheets

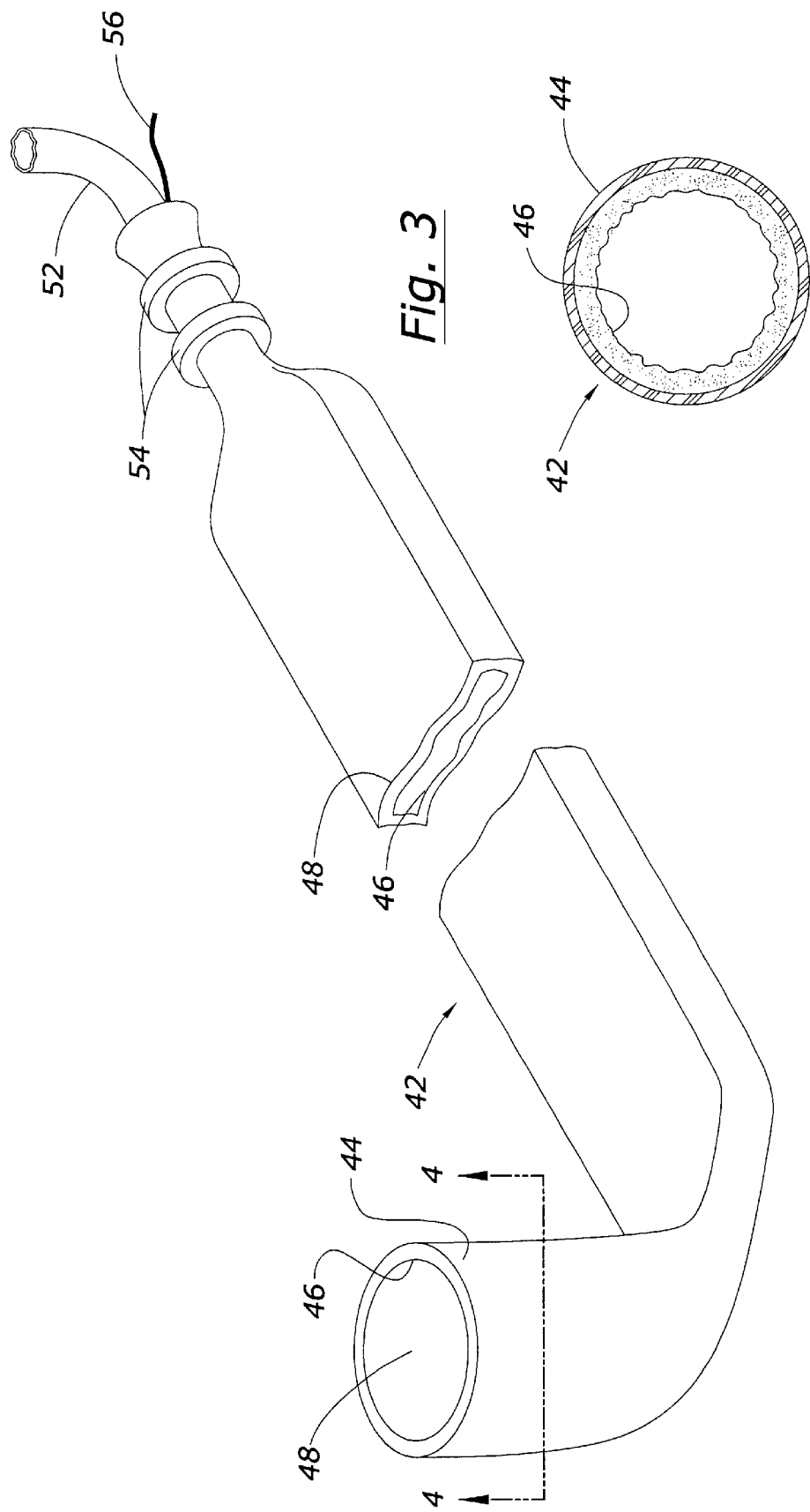

METHOD FOR RESIN ACTIVATION IN PIPELINE REPAIR

BACKGROUND OF THE INVENTION

This invention relates to a method for resin activation in pipeline repair.

A method presently used for repairing pipelines includes the use of a liner tube having a felt layer upon its inside and having a protective layer made of polymer or other plastic material on its outside. Resin is inserted into the liner tube for the repair process so as to impregnate all of the felt material within the inside of the liner tube with the resin. During this process a catalyst is also applied so as to activate the resin and cause it to begin its curing and hardening.

The liner tube is then inverted into the pipeline for repair so that the inner impregnated felt layer is inverted from the inside of the tube to the outside. The catalyst causes the resin to continue to harden, and when the resin hardens in place the felt layer provides a protective inner coat for the pipeline to be repaired.

One difficulty encountered with the present method is that the catalyst must be applied to the resin at the time that the resin is inserted into the interior of the tube and before transporting the tube to the repair site. Once the catalyst is applied to the resin, the resin begins curing and time is of the essence in order to get the liner tube in place within the pipeline to be repaired.

One method for slowing the curing of the resin is to refrigerate the liner tube until such time as it is inverted into the pipeline to be repaired. However, vehicles for refrigerating the liner tubes are expensive.

Other systems use a scaffolding to create a head of water at the repair site for inverting the liner and activating the cooled catalyst and resin. The water is circulated and heated by use of a boiler. The process of heating the water must be controlled and it takes a fair amount of time. Once the water reaches its peak temperature, that temperature must be held for a specified period of time. Then the water temperature must be cooled down in a controlled manner as well and that also takes considerable time.

As a result, many of the presently used systems for repairing pipeline take considerable amount of time. With current systems, an experienced crew can repair a pipeline between two manholes in approximately one day. Some highly skilled crews may be able to repair the pipeline between two sets of manholes in one day.

Therefore, a primary object of the present invention is the provision of an improved method for resin activation in pipeline repair.

A further object of the present invention is the provision of a method for pipeline repair which permits the resin to be placed in the liner tube in an inactivated state and permits the activation of the liner tube while it is within the pipeline to be repaired.

A further object of the present invention is the provision of a method for pipeline repair which permits the liner tube to be transported with the resin impregnated therein but without a catalyst applied.

A further object of the present invention is the provision of a method for pipeline repair utilizing a resin impregnated liner tube which can be transported without a refrigerated truck.

A further object of the present invention is the provision of a new system that will be more cost-effective than prior art systems.

A further object of the present invention is the provision of a method for resin activation in pipeline repair that permits any length of liner tube to be installed because the liner is activated only during the installation process.

BRIEF SUMMARY OF THE INVENTION

The foregoing objects may be achieved by a method for repairing a pipeline which includes impregnating a liner material capable of absorbing a fluid with a fluid uncured and unhardened resin requiring a catalyst for activation to cure and harden. The method includes inserting the impregnated liner within the pipeline to be repaired and applying a catalyst to the impregnated liner while the liner is within the pipeline. The resin is then allowed to cure and harden to form a repaired surface for the interior of the pipeline.

According to one feature of the invention the liner tube comprises an outer layer and an inner layer with the inner layer being capable of absorbing a fluid. The impregnating step comprises introducing the resin into the interior of the tube. The tube is then inverted into the pipeline so that the inner layer is inverted to the outside of the tube and the outer layer is inverted to the inside of the tube.

According to another feature of the invention the catalyst is applied to the inner layer during the inverting process.

According to another feature of the invention the applying of the catalyst is done by spraying the catalyst onto the impregnated layer.

According to another feature of the invention the catalyst is applied within the pipeline.

The preferred method of the present invention is to apply the catalyst to the liner after the liner is within the pipeline. Alternatively the catalyst could be applied immediately before insertion into the pipeline. Also, a catalyst which only partially activates the resin could be applied before transport of the liner, with an additional catalyst being applied inside the pipe for final activation.

The present invention contemplates repair of all kinds of pipelines including, but not limited to, mainline sewer pipelines and lateral sewer pipelines. In the repair of lateral sewer pipelines the lateral liner tube is inverted from the main sewer pipeline into the lateral pipeline. Using a flexible rod push camera and a spray hose the catalyst is then applied to the resin impregnated lateral liner tube as it is being inverted into the lateral pipeline.

Another method for applying the catalyst to the liner tube while the liner tube is within the pipeline is to use two liner tubes, each of which has a resin absorbing inner layer and an outer layer that is smooth. The inner layer of first liner tube is impregnated with resin, but no catalyst. It is pulled into place within the pipeline with the impregnated inner layer inside the first liner tube. Then a second similar liner tube is impregnated with catalyst in its inner layer. The second liner tube is then inverted into the first liner tube so as to place the catalyst impregnated layer outside the second liner tube. This places the inner resin impregnated layer of the first tube in contact with the outwardly presented catalyst impregnated layer of the second tube, thereby activating the resin for curing. In this arrangement the first liner tube has its smooth surface facing outwardly and the second liner tube has its smooth surface facing inwardly.

BRIEF DESCRIPTION OF THE DRAWINGS

FIG. 3 is a perspective view of the liner tube of the present invention before the insertion of uncured resin.

FIG. 4 is a sectional view taken along line 4—4 of FIG. 3.

DETAILED DESCRIPTION OF THE INVENTION

Figure 1:
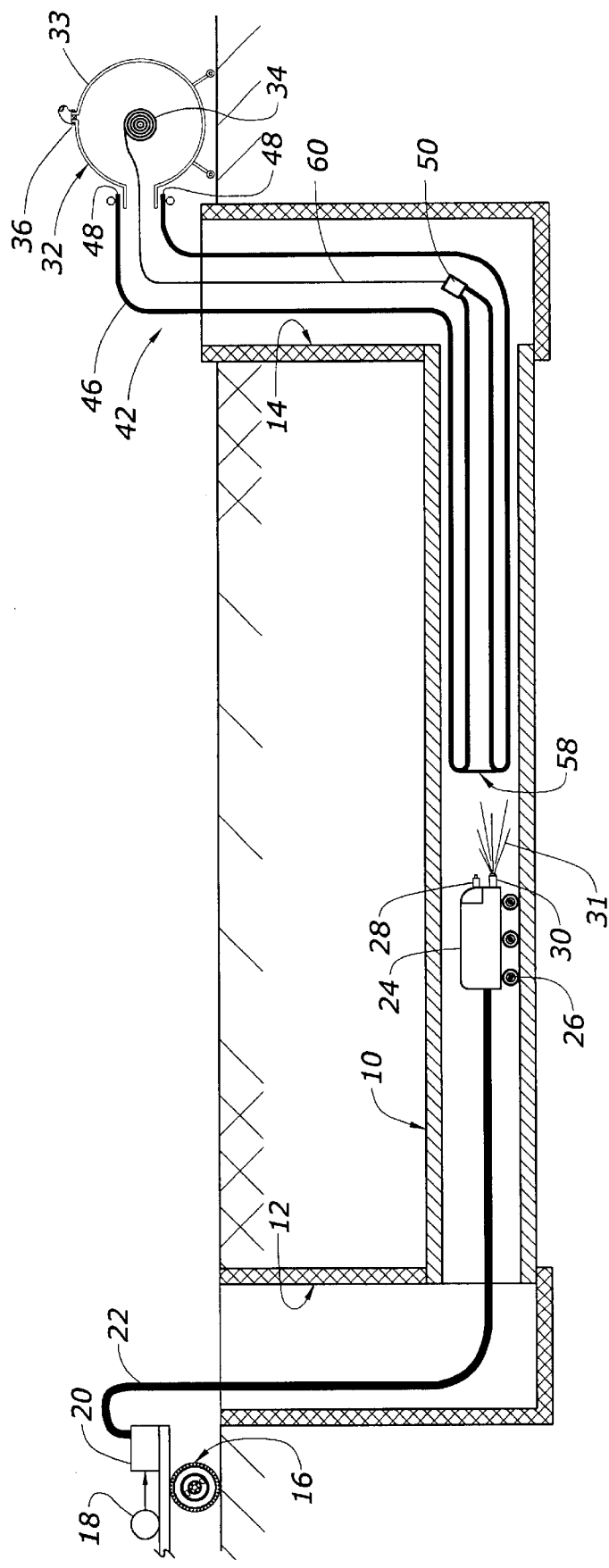
FIG. 1 is a schematic view of the present invention utilized for repairing a pipeline extending between two manholes.

Referring to FIG. 1, a pipeline 10 is shown extending between a downstream manhole 12 and an upstream manhole 14. While the present invention is shown for use with sewer pipeline repair, the present invention can be utilized for repairing almost any type of pipe.

Adjacent the downstream manhole 12 is a truck 16 having a pump 18 and a catalyst reservoir 20 mounted thereon. A hose 22 extends from the catalyst reservoir 20 down to a small tractor 24 shown within the pipeline 10. The hose 22 may include a conduit for carrying the catalyst, and may also include electronic cables for controlling the tractor 24. Tractors such as the one shown at 245 are commonly used in the pipeline repair industry, and are capable of moving along the length of the pipeline. These tractors usually include wheels 26 and a camera 28. The tractor of the present invention is also provided with a spray nozzle 30 which is connected to a conduit within hose 22 for spraying catalyst in the direction indicated by the spray lines 31 in the drawing.

Outside and above the upstream manhole 14 is a pressurized reel 32 which contains an outer cylindrical housing 33 and which includes a center roller 34 at its center. A pressure inlet valve 36 provided in the housing 33 and provides communication from the interior of the housing to a pressure hose 38. Pressure hose 38 is preferably connected to a pneumatic source of pressurized air. However, other fluids could be used without detracting from the invention. The valve 36 is movable from an open position permitting pressurized fluid (preferably air) to be introduced to the interior of pressurized reel 32. The valve is also moved to a closed position shutting off communication of pressurized fluid from the interior of the pressurized reel 32. The reel 32 includes an inverting boss 40 on one of its sides upon which may be mounted a liner tube designated generally by the numeral 42.

Liner tube 42 is shown in FIGS. 3 and 4, and includes an outer layer 44 and an inner layer 46. Outer layer 44 is preferably a polymerized material such as polyethylene, polyvinyl chloride, polyurethane, or other suitable polymers. The interior layer 46 is preferably comprised of a material capable of absorbing a fluid resin. The preferred material for inner layer 46 is felt, but other fluid absorbing materials could be used without detracting from the invention. The important characteristic of layer 46 is that it be capable of absorbing the resin when it is inserted into the tube.

The term "resin" as used herein includes the base resin material either with or without certain additives such as "initiators". The term "initiator" refers to one or more ingredients mixed with the base resin which, upon exposure to a predetermined temperature threshold, cause a temperature rise in the resin or which react when contacted by a catalyst to cause the resin to cure. Examples of these materials are as follows:

Base Resin

1. Model No. COR75-AA-656, manufactured by Interplastic Corporation, Thermoset Resin Division, 2015 Broadway Street, N.E., Minneapolis, Minn. 55413-1714.

Initiators—The following initiators are manufactured by AKZO Nobel Polymer Chem. LLC, 300 South Riverside Plaza, Chicago, Ill. 60606:

1. Dibenzoyl Peroxide, Model BTW-50.
2. Tert-Butyl Peroxybenzoate, Model Trigonox-C.
3. Di(4-Tert-Butylcyclohexyl)Peroxydicarbonate, Model Perkadox.

It is preferred that at least the first initiator listed above be mixed with the base resin, but any combination of the above initiators may be mixed with the resin. Furthermore, other additives or initiators may be used without detracting from the invention.

Referring to FIG. 3, the resin is poured into the open end 48 of tube 42 and is forced downwardly toward the closed end 50 by means of a roller or other device which flattens the tube 42 and causes the resin to be moved toward the closed end. A vacuum hose 52 is connected to the closed end 50 by means of clamps 54. Also, a wick 56 extends into the interior of the tube 42 and provides a means for air to escape during the insertion of the resin. Once the resin has fully impregnated the inner layer 44 of liner tube 42, it is ready for insertion into the pressurized reel 32. The closed end 50 is wound around roller 34 in a coil like manner, and the open end 48 is fitted over and clamped upon the inverting boss 40.

Therefore, the resin within the liner tube 42 remains in an uncured fluid state, and had not yet activated to cure and harden. The advantage of this process is that the liner tube 42 can be transported and stored for several days without the resin curing within the liner tube. In prior methods the catalyst was applied at the same time that the resin was introduced into the liner tube, and therefore the curing process began immediately. Usually the resins and catalyst used in these prior art methods were chosen so that the curing would begin at higher temperatures. Full curing usually occurs at approximately 190°, but the resin and catalyst will begin to cure when exposed to much lower temperatures such as 80° to 90°. Therefore with prior methods refrigerants are necessary in order to keep the liner tubes of present methods cool until they are ready to be inserted into the pipeline for repair.

The present invention does not require initiators or resins that are activated at high temperatures. Instead, these materials may be chosen for their characteristic of being activated at ambient temperatures because the catalyst is not applied until the liner tube is within the pipeline to be repaired.

Figure 2:
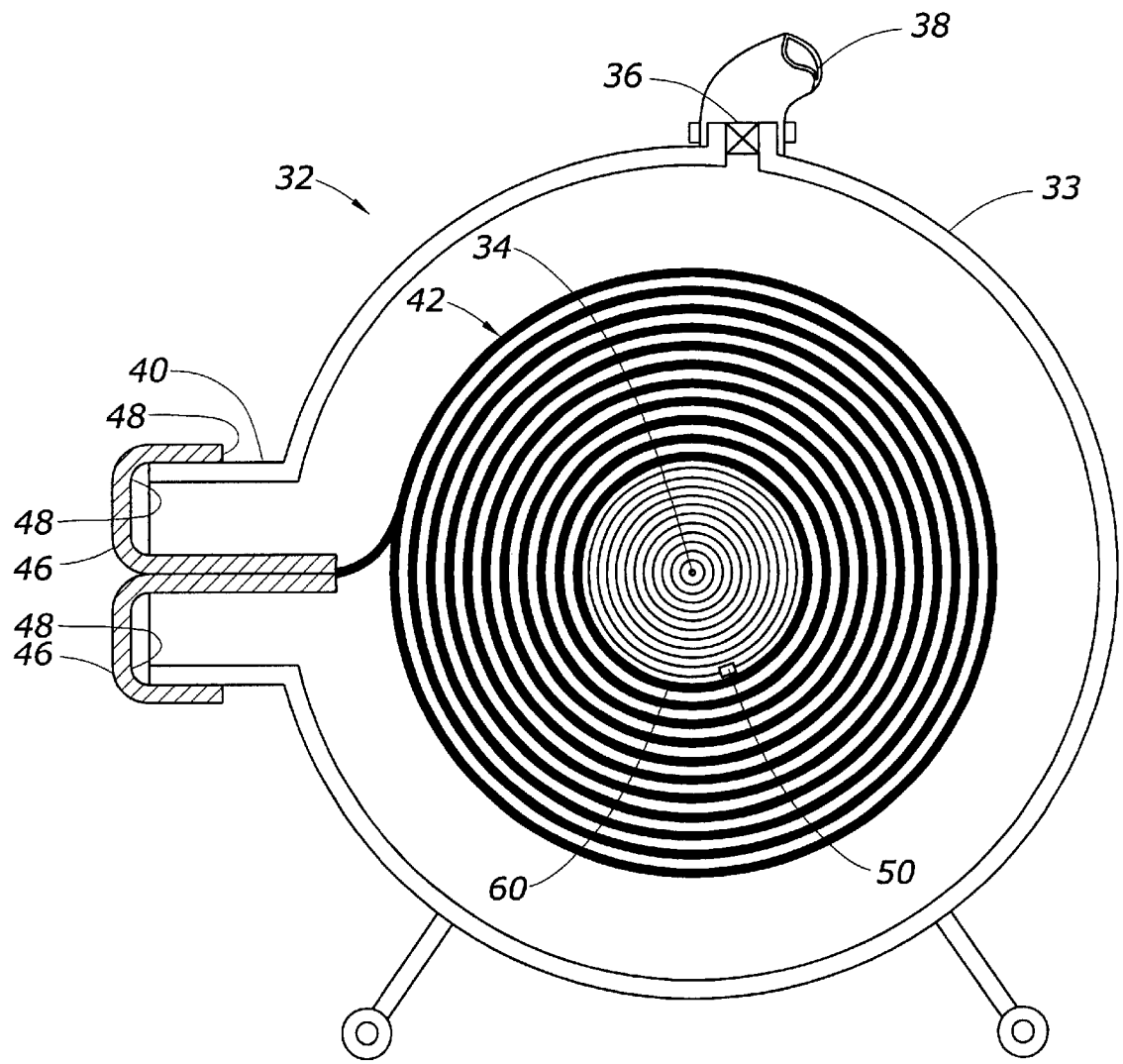
FIG. 2 is an enlarged detailed view of the pressurized reel used with the present invention.

A rope 60 is wound around the center roller 34 within the pressurized reel 32. Sufficient rope must be included to go the entire length of the pipeline 10 to be repaired. At the outer end of the rope the closed end of the liner tube 50 is attached. The liner tube is then wound around the center roller until its complete length is taken up. The open end 48 of the liner tube is fitted over the boss 40 and is tapped or clamped in place so as to have an airtight connection therearound. As can be seen in FIG. 2 the open end 48 is folded back upon itself much in the same fashion as the peeling off of a sock. This exposes the inner felt surface 46 to the outside of the tube and causes the outer layer 44 to be placed on the inside of the liner tube.

It is preferred that up to this point in the process no catalyst has been applied to the resin. As used herein, the term "catalyst" refers to any chemical that, upon coming in contact with the resin, causes activation of the resin and/or any initiators contained in a base resin to cause the resin to cure and harden. While various catalysts may be used, the preferred catalyst is Dimethylaniline, Model MD 222, manufactured by Reactive Solutions, Inc., 404 West Nebraska Street, Elburn, Ill. 60119.

The valve 36 is then moved to its open position and fluid pressure, preferably air, is introduced to the interior of the reel 32. This pressure causes the inversion of the liner tube in a progressive manner so that it moves down into the manhole and into the pipeline being repaired. FIG. 1 shows the liner tube in a partially inverted position. Numeral 58 designates the "point of inversion" of the liner tube. The point of inversion refers to the place where the liner tube begins its folding action to cause the inversion of the inner felt layer to move to the outside. This point of inversion moves progressively down the pipeline 10 until the liner tube completely covers the entire length of the pipeline 10.

When the liner tube 42 is first introduced into the right-hand end of the pipeline 10, the tractor 24 is maneuvered to a position immediately opposite the point of inversion 58. A catalyst is sprayed through the sprayer 30 onto the felt at the point of inversion thereby causing the resin to be activated. The resin and the catalyst are preferably chosen to be activated at ambient temperatures so that the curing of the resin begins immediately upon exposure to the catalyst.

The closed end 50 has attached to it the rope 60, and it is possible to maintain tension on the closed end 50 by means of the rope 60 and the reel handle (not shown) of reel 32. The camera 28 on the tractor 24 permits the operator to continue to maneuver the tractor 24 so that it is maintained adjacent the point of inversion 58.

When the liner tube has been inverted throughout the entire length of the pipeline 10, the closed end 50 protrudes within the downstream manhole 12 and can be cut off at the desired length.

Several advantages are obtained by the present invention. The chemical cures at ambient temperatures, and no heat is required as in prior art devices.

Furthermore, in at least some applications it is not necessary to refrigerate the liner tube during transport because no catalyst has been applied and it remains in an uncured state. The resin can be maintained for several days within the liner tube without the application of catalyst. If low threshold initiators are used they may activate at ambient temperatures during transport so as to warm the resin. Refrigeration may be used to prevent this warming in some applications. But it may be desirable to let the resin warm up during transport so that it will cure faster when exposed to a catalyst in the pipeline being repaired.

Prior devices usually require the construction of a scaffold to handle a heated water system. Such a scaffold is not required for the present invention.

Prior devices also required a water heat system including a boiler truck. No such boiler truck or watering heating system is required in the present invention.

Any length of liner tube may be installed with the present invention because the liner is activated only during the installation process. Prior systems are limited to length because of the time it takes to invert the liner and because ambient outside temperature can cause the resin to partially activate before installation in to the pipeline to be repaired.

FIGS. 1–4 disclose the use of the invention for repairing a damaged mainline sewer pipe. The present invention may also be used for repairing a lateral pipeline extending from a main pipeline.

Figure 5:
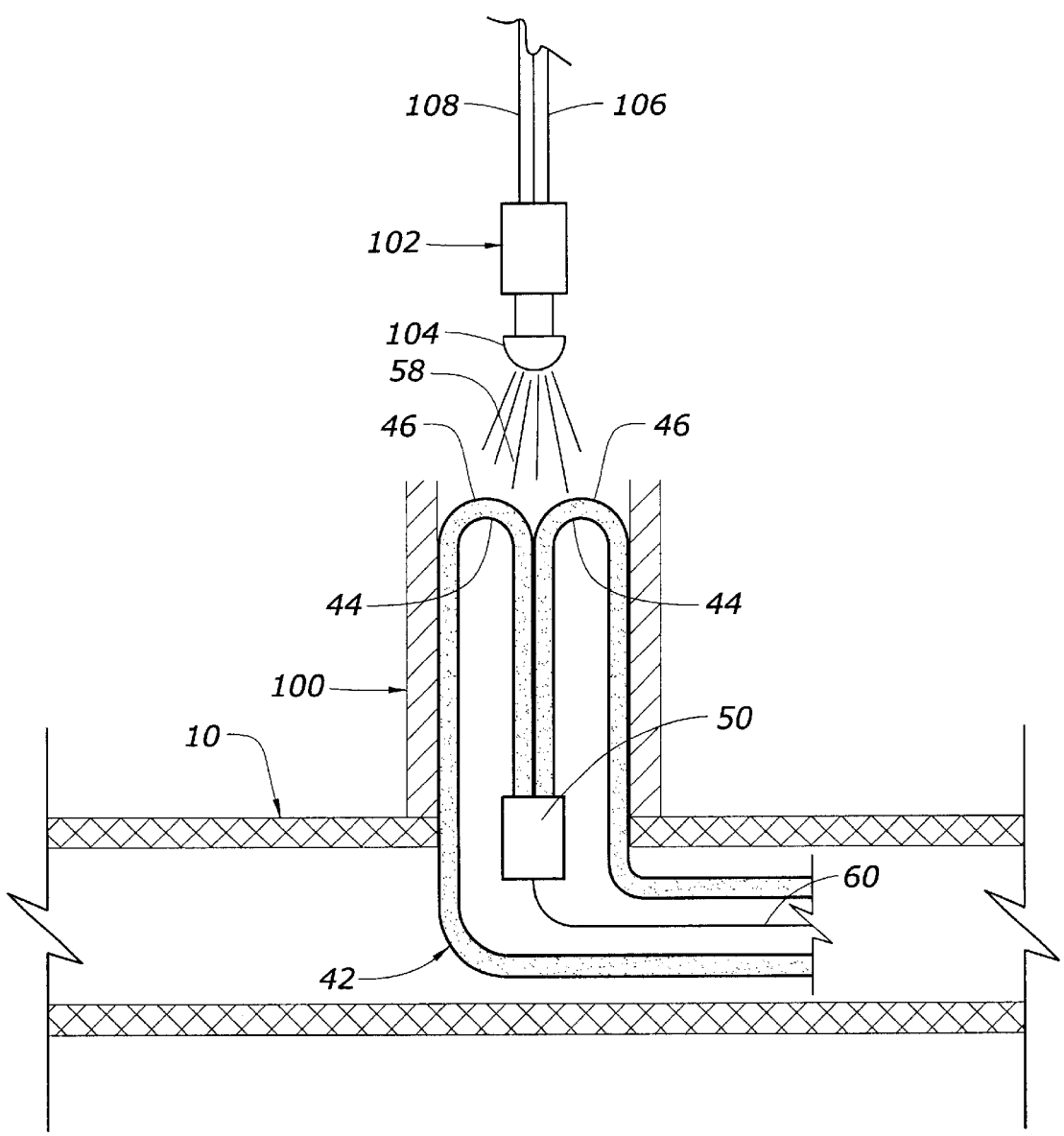
FIG. 5 is a partial sectional view of a modified embodiment of the invention for use in repairing lateral pipelines.

FIG. 5 shows a main pipeline 10 having a lateral pipeline 100 extending outwardly therefrom. The liner tube 42 having a felt layer 46 and a closed end 50 is inverted into the lateral pipeline 100. The particular method and apparatus for inverting the liner tube 42 into the lateral pipeline 100 is known in the art and is shown in my U.S. Pat. No. 6,039,079.

As the liner 42 is inverted into the lateral pipeline 100 a catalyst is sprayed on the resin impregnated material 46 at the point of inversion 58. The spraying is accomplished by the use of a camera 102 mounted on the end of a flexible push rod 108. Such cameras and push rods are well known in the art. As part of the invention a spray head 104 is mounted on the camera 102 and includes a spray tube 106 leading from the spray head 104 to a source of catalyst. The camera is used to view the point of inversion 58, and the spray head 104 is used to spray the catalyst on the resin within the lateral pipeline 100 for activating the resin in the liner tube 42 and causing it to harden.

Figure 6:
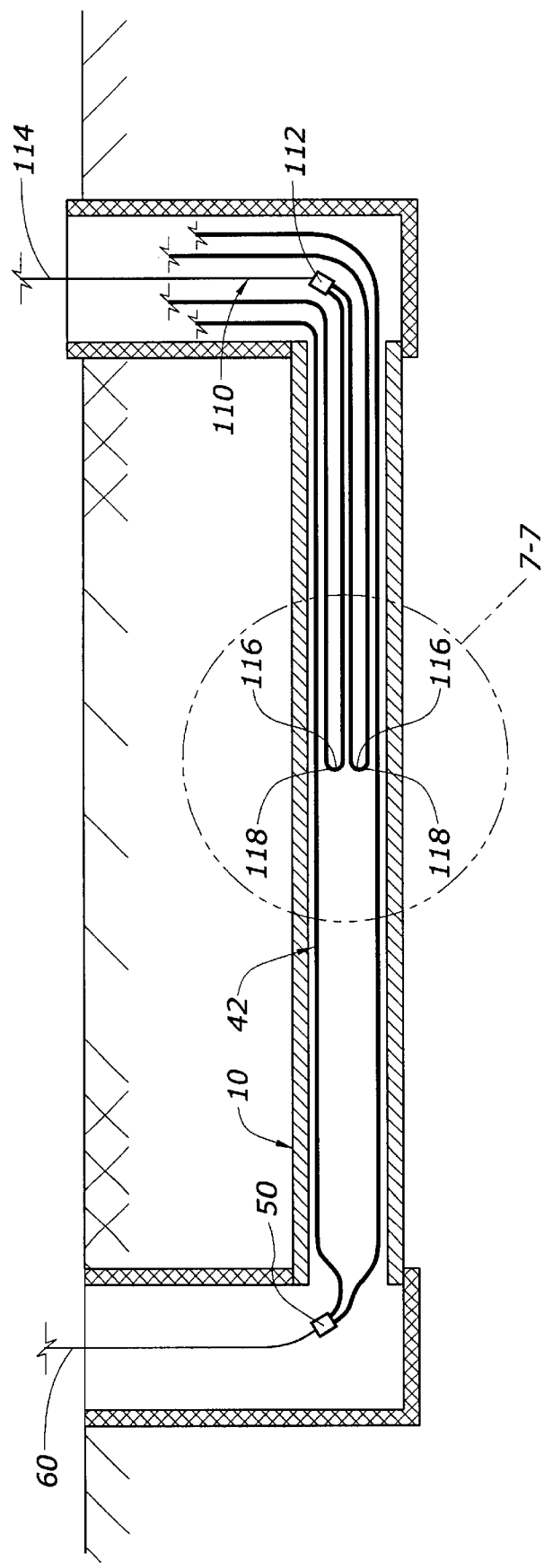
FIG. 6 is a schematic view of another embodiment of the present invention.
Figure 7:
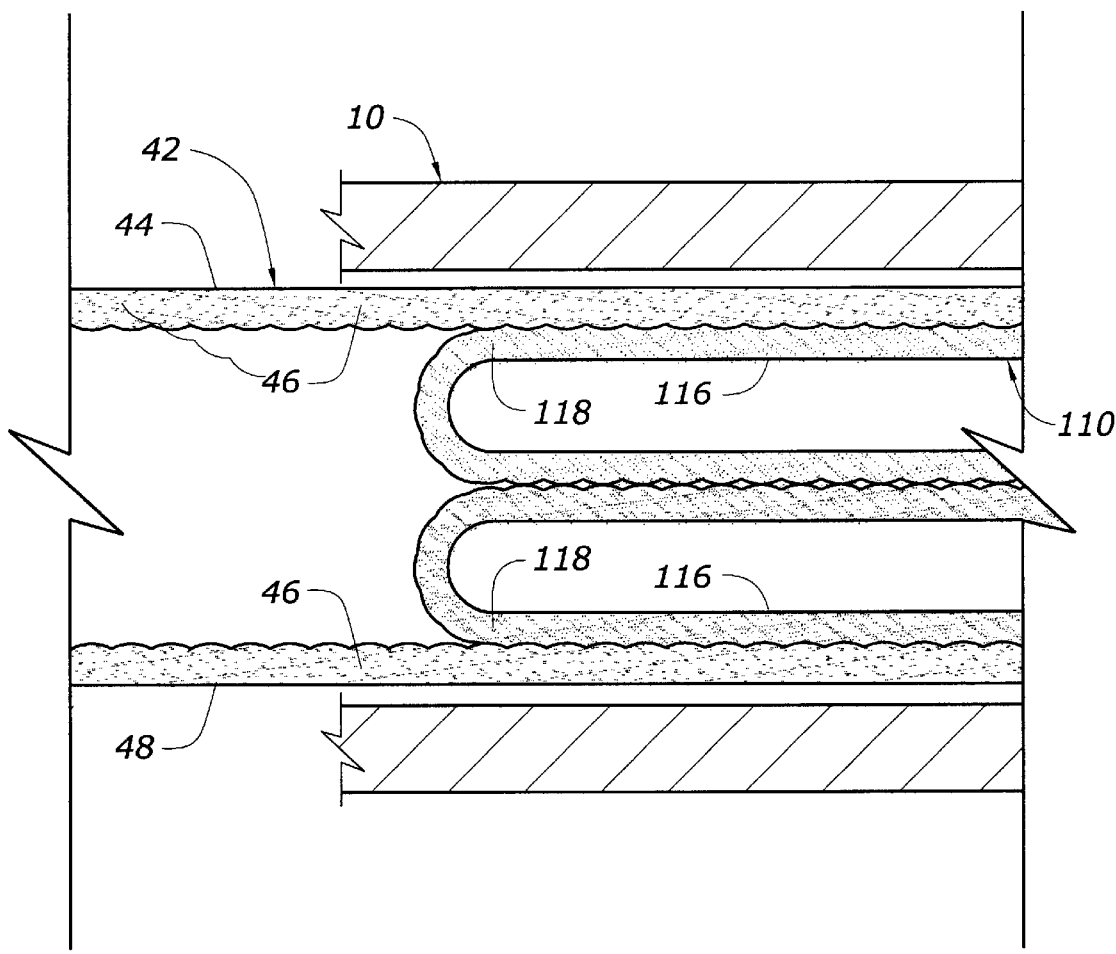
FIG. 7 is an enlarged view taken along line 7—7 of FIG. 6.

The catalyst may be applied to the resin within the pipeline by methods other than spraying. FIGS. 6 and 7 show one method by which this may be done without spraying. The first liner tube 42 is pulled through the main pipeline 10 by means of the rope or cord 60. It is not in an inverted state, and as can be seen in FIG. 7 the felt material 46 impregnated with resin is disposed inwardly with respect to the first liner tube 42 and the smooth outer surface 44 is disposed outwardly.

A second liner tube 110 is of similar construction to the first liner tube 42, but is preferably smaller in diameter and includes a second closed end 112, a second rope 114, a smooth layer 116 and a felt layer 118. The felt layer 118 is impregnated with catalyst rather than resin, and the second liner 110 can be transported with this catalyst impregnated within the felt material 118.

Once the first liner tube 42 is positioned in place within the main pipeline 10, the second liner tube 110 is inverted into the interior of the first liner tube 42. As the second liner tube 110 is inverted, it causes the felt material 118 to be inverted from the interior of the second liner tube 110 to the exterior. As can be seen in FIG. 7 this causes the catalyst impregnated layer 118 to come in contact with the resin impregnated layer 46 of the first liner tube 42. When the resin and catalyst come in contact with one another the catalyst activates the resin and the resin begins to cure and harden. Upon completion the hardened repair is formed by both the first liner 42 and the second liner 110. The smooth outer surface 44 of first liner tube 42 forms a smooth outer surface of the repair, and the smooth inner surface 116 of the second liner tube 110 forms a smooth inner surface for the repair.

The preferred method of the present invention is to apply all of the catalyst to the resin after the liner is within the pipeline. Alternatively the catalyst could be applied immediately before insertion into the pipeline.

Heat is an important factor in causing the resin to cure. By choosing different combinations of initiators mixed with the base resin, it is possible to cause the resin to be heated during transport. This heating may cause a start of curing, but only after the catalyst comes in contact with the resin does the curing action speed up. However, if the initiators preheat the resin, the curing action is much faster when the catalyst is applied.

An alternative to preheating the resin is to preheat the catalyst. That also will speed up the curing action of the resin.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A method for repairing a pipeline comprising:
   impregnating a liner material capable of absorbing a fluid with a fluid uncured and unhardened resin requiring a catalyst for activation to cure and harden;
   inserting the impregnated liner material within the pipeline to be repaired;
   adding a catalyst to the impregnated liner while the liner is within the pipeline; and
   allowing the resin to cure and harden to form a repaired surface for the interior of said pipeline.

2. A method according to claim 1 and further comprising using a tube shaped configuration for said liner material.

3. A method according to claim 2 wherein said tube comprises an outer layer and an inner layer, said inner layer being said liner material capable of absorbing a fluid, said impregnating step comprising introducing said resin into the interior of said tube.

4. A method according to claim 3 and further comprising inverting said tube into said pipeline so that said inner layer is inverted to the outside of said tube and said outer layer is inverted to the inside of said tube.

5. A method according to claim 4 wherein said adding step comprises applying said catalyst to said inner layer during the time that said inner layer is being inverted to the outside of said tube.

6. A method according to claim 1 wherein no catalyst is applied to said resin impregnated material outside said pipeline.

7. A method according to claim 1, wherein said resin impregnated material is within a first liner tube, said step of adding a catalyst comprising inverting a second liner tube into said first mentioned liner tube, said second liner tube having an internal catalyst impregnated layer which inverts outwardly during said inverting and which comes into contact with said resin impregnated layer during said inverting.

8. A method according to claim 1 wherein said method comprises repairing a main sewer pipeline.

9. A method according to claim 1 wherein said resin impregnated material is within a first liner tube, said method comprising inverting said resin impregnated material of said first liner tube from a main sewer pipeline into a lateral sewer pipeline and said adding of said catalyst is done within said lateral pipeline during said inversion step.

10. A method according to claim 1 wherein said adding of said catalyst is done by spraying said catalyst on said resin impregnated material during said inversion of said first liner tube into said main sewer pipeline.

11. A method for repairing a pipeline comprising:
    taking a liner tube having an inner layer and an outer layer, said inner layer comprising a material capable of absorbing a fluid;
    inserting a fluid uncured and unhardened resin into said liner tube so that said inner layer becomes impregnated with said resin, said resin being capable of remaining in an uncured state until exposed to a catalyst;
    inverting said liner tube into said pipeline to that said inner layer is inverted to the outside of said liner tube and said outer layer is inverted to the inside of said liner tube;
    adding a catalyst to said impregnated inner layer within said pipeline during the time that said inner layer is being inverted into said pipeline;
    permitting said resin to cure and harden after said application of said catalyst.

12. A method according to claim 11 wherein said adding of said catalyst to said impregnated layer is done by spraying said catalyst onto said impregnated layer.

13. A method according to claim 11 wherein said inserting of resin step is done at a point remote from said pipeline, and said liner tube is transported to said pipeline after inserting of said resin into said liner tube, and before said adding of said catalyst.

14. A method for repairing a pipeline comprising:
    taking a liner tube having an inner layer and an outer layer, said inner layer comprising a material capable of absorbing a fluid;
    introducing a fluid uncured and unhardened resin into said liner tube in the absence of a catalyst so that said inner layer becomes impregnated with said resin, said resin being capable of remaining in an uncured state until exposed to a catalyst;
    maintaining said resin impregnated inner layer within said liner tube in the absence of a catalyst for a predetermined period of time;
    inverting said liner tube into said pipeline so that said inner layer is inverted to the outside of said liner tube;
    applying a catalyst to said resin impregnated inner layer while said liner tube is within said pipeline.

15. A method according to claim 14 and further comprising transporting said liner tube after said introducing step to the site of said pipeline during said predetermined period of time of said maintaining step.

16. A method according to claim 15 wherein said predetermined time is greater than one hour.

17. A method according to claim 15 wherein said predetermined time is greater than 6 hours.

18. A method according to claim 15 wherein said predetermined time is greater than 12 hours.

19. A method according to claim 15 wherein said predetermined time is greater than one day.

* * * * *